(12) United States Patent
 Yoshizawa

(10) Patent No.: US 10,430,137 B2
(45) Date of Patent: Oct. 1, 2019

(54) PRINTER AND PRINTING METHOD

(71) Applicant: SATO HOLDINGS KABUSHIKI KAISHA, Tokyo (JP)

(72) Inventor: Koji Yoshizawa, Charlotte, NC (US)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/121,989

(22) PCT Filed: Jul. 13, 2015

(86) PCT No.: PCT/JP2015/070017
§ 371 (c)(1),
(2) Date: Aug. 26, 2016

(87) PCT Pub. No.: WO2016/009986
PCT Pub. Date: Jan. 21, 2016

(65) Prior Publication Data
US 2017/0068491 A1   Mar. 9, 2017

(30) Foreign Application Priority Data

Jul. 18, 2014   (JP) .................................. 2014-147746

(51) Int. Cl.
| | |
|---|---|
| *G06F 3/12* | (2006.01) |
| *B41J 3/01* | (2006.01) |
| *B41J 5/30* | (2006.01) |
| *B41J 21/16* | (2006.01) |
| *B41J 5/44* | (2006.01) |

(Continued)

(52) U.S. Cl.
CPC ............... *G06F 3/128* (2013.01); *B41J 3/01* (2013.01); *B41J 5/30* (2013.01); *B41J 5/44* (2013.01); *B41J 21/16* (2013.01); *G06F 3/1204* (2013.01); *G06F 3/1222* (2013.01); *G06F 3/1238* (2013.01); *G06K 9/00469* (2013.01); *G06K 15/024* (2013.01); *H04N 1/00334* (2013.01); *G06K 2215/0088* (2013.01);

(Continued)

(58) Field of Classification Search
CPC ....................................................... G06F 3/128
See application file for complete search history.

(56) References Cited

U.S. PATENT DOCUMENTS

| | | | | |
|---|---|---|---|---|
| 4,799,169 A | * | 1/1989 | Mims ....................... | G01F 1/363 702/47 |
| 2005/0265066 A1 | * | 12/2005 | Machiyama ....... | H04N 1/00278 365/145 |

(Continued)

FOREIGN PATENT DOCUMENTS

| | | |
|---|---|---|
| JP | 2000-238390 A | 9/2000 |
| JP | 2005-345608 A | 12/2005 |

(Continued)

OTHER PUBLICATIONS

Extended European Search Report (EP 15822319.8), Jun. 23, 2017, 8 pages.

*Primary Examiner* — Ibrahim Siddo
(74) *Attorney, Agent, or Firm* — Foley & Lardner LLP

(57) ABSTRACT

Perform printing by a printing portion onto the printing paper sheet after collating a content of a code optically or electromagnetically read by a reading device connected to a printer main body and a content of printing data supplied from a memory connected to this printer main body.

10 Claims, 3 Drawing Sheets

(51) Int. Cl.
*G06K 9/00* (2006.01)
*G06K 15/02* (2006.01)
*H04N 1/00* (2006.01)
*H04N 1/32* (2006.01)

(52) U.S. Cl.
CPC ..... *H04N 1/32122* (2013.01); *H04N 1/32138* (2013.01); *H04N 2201/3228* (2013.01)

(56) References Cited

U.S. PATENT DOCUMENTS

| | | | |
|---|---|---|---|
| 2008/0091735 A1* | 4/2008 | Fukushima | G06F 21/6209 |
| 2009/0002733 A1* | 1/2009 | Kakigi | G06F 3/1296 |
| | | | 358/1.9 |
| 2011/0052295 A1 | 3/2011 | Matsuda | |
| 2011/0058185 A1 | 3/2011 | Arihara | |
| 2012/0236329 A1* | 9/2012 | Kobayashi | G06K 15/1805 |
| | | | 358/1.6 |
| 2014/0098398 A1* | 4/2014 | Hobbs | G06F 17/30879 |
| | | | 358/1.15 |

FOREIGN PATENT DOCUMENTS

| | | | |
|---|---|---|---|
| JP | 2008-166919 | * | 1/2008 |
| JP | 2008-166919 | * | 7/2008 |
| JP | 2008-166919 A | | 7/2008 |
| JP | 2009-96111 A | | 5/2009 |

* cited by examiner

PRINTER AND PRINTING METHOD

TECHNICAL FIELD

The present invention relates to a printer, a printing method thereof, and a non-volatile memory, especially relating to a stand-alone printer, and a printing method and a non-volatile memory thereof.

BACKGROUND ART

Conventionally, there has been a printer, which issues a printing paper sheet such as a label, a tag, or a label without a liner sheet on which predetermined information is printed (see JP2000-238390A).

This printer employs any printing system including a thermal transfer system, which uses a thermal transfer ink ribbon, a thermal coloring system, which uses a thermal paper, an ink jet system, or an electrostatic printing system, however, various kinds of printing data or commands, or various kinds of software for printing operations are necessary.

Such printing data or similar information is generally input to a printer directly, or supplied through an interface from a host computer such as a control unit including an external personal computer.

However, in a case where an operator of the printer is unfamiliar with operating the personal computer, there is a problem that an erroneous use or an unforeseen error may possibly be caused at a site of use.

On the other hand, a conventional stand-alone printer requires an operation to input various kinds of printing data or commands to the printer by using an operating unit and a display equipped to the printer, which means use of a key operation or a touch operation. In a case where an operator is unfamiliar with the input operation of these, there is a problem that an erroneous use or an unforeseen error may possibly be caused, similarly.

In a word, there may be a case where a printer that is easy to operate is desired, which does not use a host computer such as a personal computer connected to the printer, ensures a simple and reliable printing operation at a printing operation site, and does not require a complicated operation even for an operator without skill.

Furthermore, when an alteration prevention or a fraudulent act prevention is required for a printing content on the above-described printing paper sheet, there is a problem that taking a measure to maintain a confidentiality of printing data is needed such that the printing data cannot easily be altered even by an operator at the printing operation site.

SUMMARY OF INVENTION

The present invention has been made in view of such technical problems, and it is an object of the present invention to provide a printer that does not use a host computer such as a personal computer connected to the printer, and ensures a simple and reliable printer operation at a printing operation site, and a printing method and a non-volatile memory thereof.

The following aspect of the present invention focuses on making printing data or similar information suppliable to a printer by storing in a non-volatile memory such as a USB (Universal Serial Bus) flash drive, and utilizing a reading operation of an operation code by a reading device including a scanner connected to the printer.

A first aspect is a printer that includes a printing portion, which performs printing on a printing paper sheet, and a control unit, which controls this printing portion. The printer includes a printer main body including the above-described printing portion and the above-described control unit. The above-described control unit controls to perform printing by the above-described printing portion onto the above-described printing paper sheet after collating a content of an operation code optically or electromagnetically read by a reading device connected to this printer main body and a content of printing data supplied from a non-volatile memory connected to this printer main body.

A second aspect is a printing method for a printer that includes a printing portion, which performs printing on a printing paper sheet, and a control unit, which controls this printing portion. The above-described printer includes a printer main body including the above-described printing portion and the above-described control unit. The printing method includes: optically or electromagnetically reading an operation code by a reading device connected to this printer main body; and receiving printing data from a non-volatile memory connected to this printer main body, and controlling by the above-described control unit to perform printing by the above-described printing portion onto the above-described printing paper sheet connected to this printer main body after collating a content of the above-described operation code read by the above-described reading device and a content of the above-described printing data supplied from the above-described non-volatile memory.

A third aspect is a non-volatile memory for connection to a printer that includes a printing portion, which performs printing on a printing paper sheet, and a control unit, which controls this printing portion. The non-volatile memory stores printing data for the above-described printing paper sheet by the printing portion to make this printing data suppliable to the above-described printer, and enables a printing operation by the above-described printing portion of the above-described printing data onto the above-described printing paper sheet after the above-described control unit collates a content of an operation code optically or electromagnetically read by a reading device connected to the above-described printer and a content of the above-described printing data the non-volatile memory supplies.

The above-described operation code may include a collation keyword included in the above-described printing data.

The above-described control unit may control to print desired data in the above-described printing data on the above-described printing paper sheet in a case where the above-described collation keywords in the above-described operation code and in the above-described printing data match.

The above-described operation code may include an in-operation code keyword identification command for identifying the above-described collation keyword in the above-described operation code.

The above-described printing data may include an in-printing data keyword identification command for identifying the above-described collation keyword in the above-described printing data.

The above-described printing portion may perform printing onto the above-described printing paper sheet at every reading operation of the above-described operation code by the above-described reading device.

The above-described printer main body may include a display, and displays a content that demands the reading operation of the above-described operation code by the above-described reading device on this display.

The above-described operation code may include a barcode or a two-dimensional code.

A printer, and a printing method and a non-volatile memory thereof according to the aspects of the present invention ensures performing a printing operation with a simple operation at a printing operation site without connecting the printer to a host computer such as a personal computer because a non-volatile memory such as a USB flash drive stores the printing data to supply to the printer, and an operation code that a reading device connected to a printer reads and the above-described printing data are collated.

Especially, according to the printer of the first aspect, after collating a content of an operation code optically or electromagnetically read by a reading device connected to a printer main body and a content of printing data supplied from a non-volatile memory connected to the printer main body, printing by a printing portion onto a printing paper sheet is controlled to be performed, thus, as a stand-alone printer, it is easily usable at a printing operation site even with the operation unfamiliar with a personal computer or a data input operation.

According to the printing method of the printer of the second aspect, an operation code is optically or electromagnetically read by a reading device connected to a printer main body, and printing data is received from a non-volatile memory connected to this printer main body, then printing by a printing portion onto a printing paper sheet is controlled to be performed after collating a content of the operation code read by the reading device and a content of the printing data supplied from the non-volatile memory, thus ensuring a printing operation reliably and easily without requiring an input operation of complicated data or a command even by the operator unfamiliar with data processing.

According to the non-volatile memory of the third aspect, printing data for a printing paper sheet by the printing portion is stored to make this printing data suppliable to a printer, and a printing operation by the printing portion of the printing data onto the printing paper sheet is ensured after a control unit of the printer collates a content of an operation code read by a reading device connected to the printer and a content of the printing data supplied by the non-volatile memory, thus it is usable by connecting to any stand-alone printer.

DESCRIPTION OF EMBODIMENTS

In the embodiments according to the present invention, a printer, a printing method and a non-volatile memory thereof that can perform a printing operation easily and reliably even with an operation unfamiliar with a personal computer or a data input operation are achieved, with a non-volatile memory supplying printing data and a relatively simple and reliable operation which is a reading operation of an operation code by a reading device.

Figure 1:
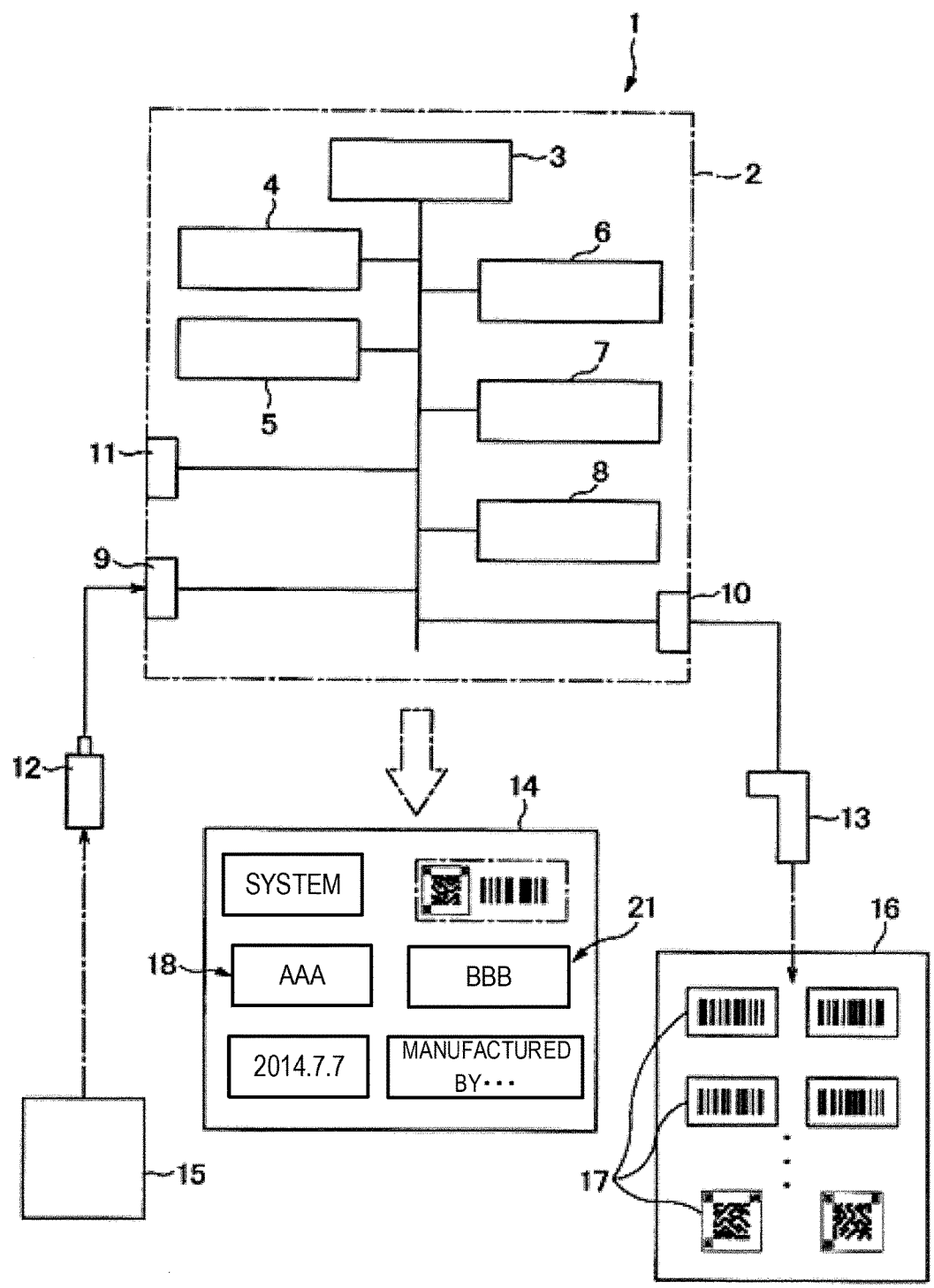
FIG. 1 is a schematic block diagram of a printer according to an embodiment of the present invention.
Figure 2A:
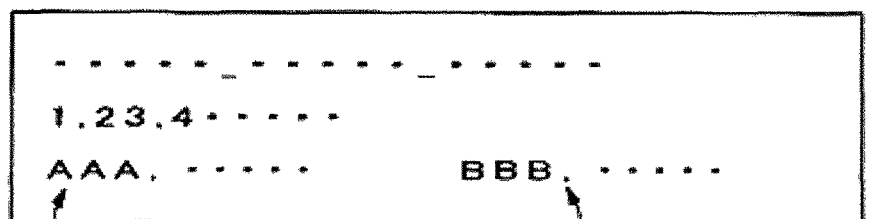
FIG. 2A is an explanatory diagram of a collation keyword (for example, "AAA") in printing data among contents of the printing data from a USB flash drive.
Figure 2B:
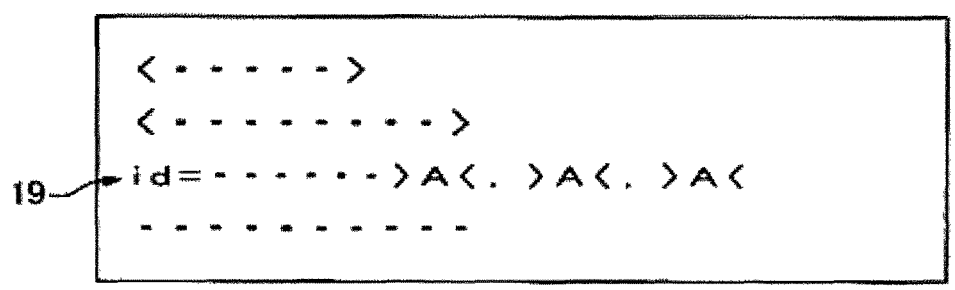
FIG. 2B is an explanatory diagram of an in-printing data keyword identification command for identifying a collation keyword.
Figure 2C:
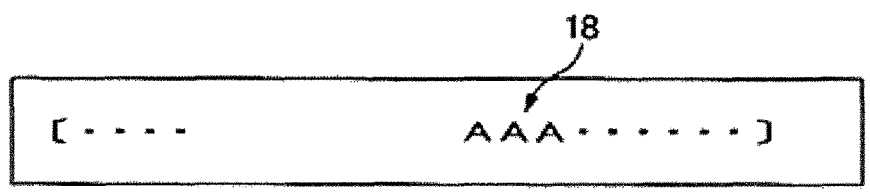
FIG. 2C is an explanatory diagram of an collation keyword in an operation code among contents of the operation code read by a scanner.
Figure 2D:
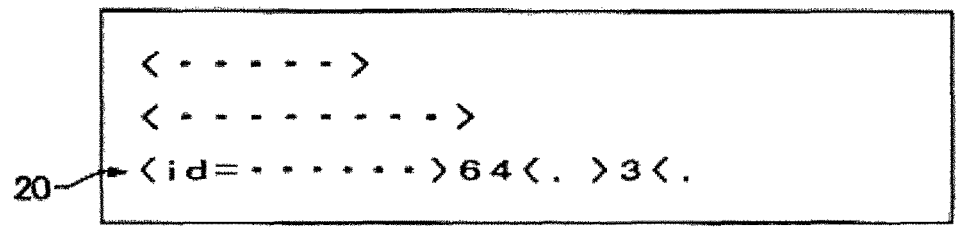
FIG. 2D is an explanatory diagram of an in-operation code keyword identification command for identifying a collation keyword.
Figure 3:
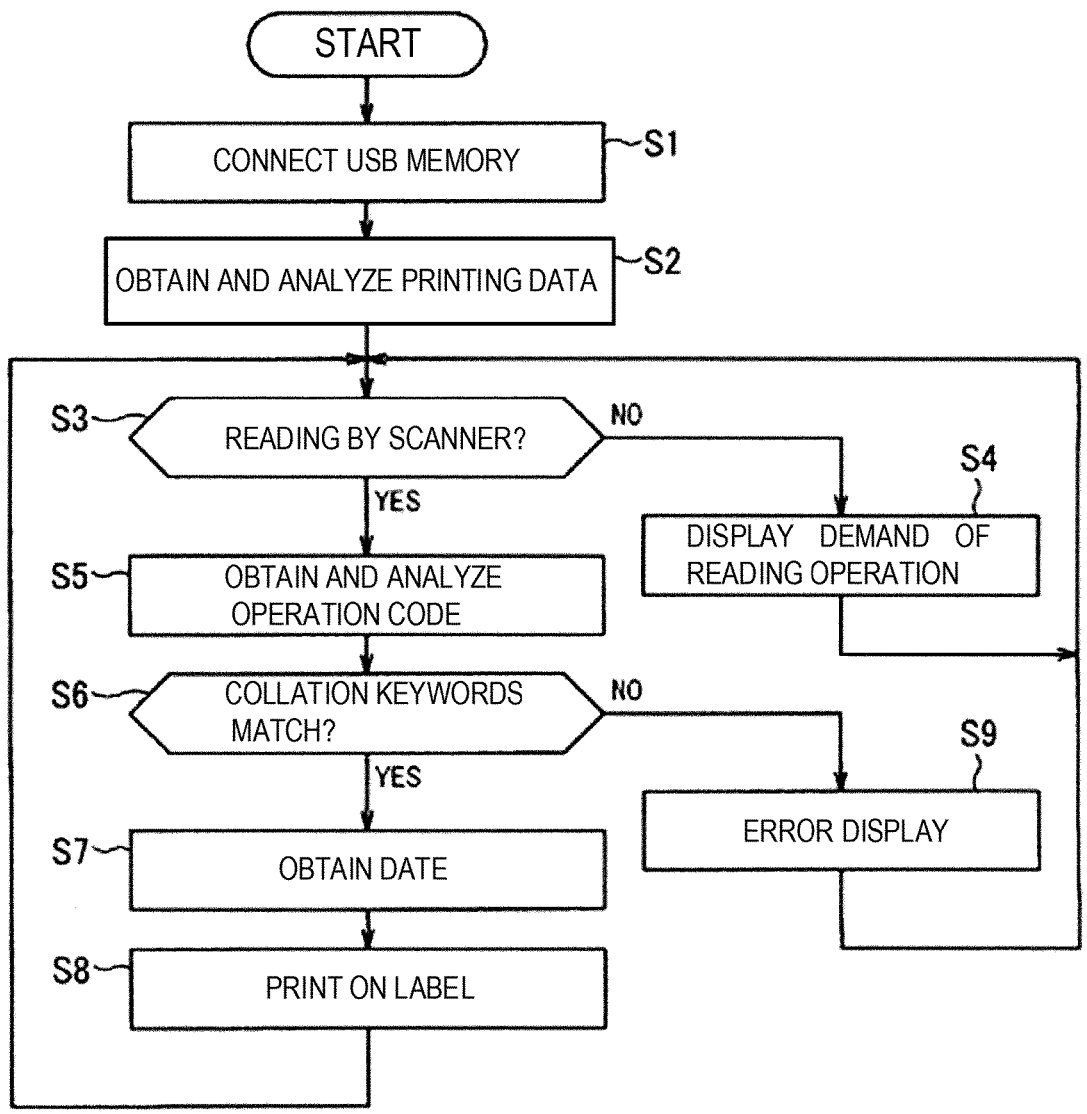
FIG. 3 is a flowchart describing printing operation of a printer.

The following describes a printer 1, its printing method, and a non-volatile memory according to embodiments of the present invention on the basis of FIG. 1 to FIG. 3.

FIG. 1 is a schematic block diagram of the printer 1. The printer 1 is a printer of any printing system, for example, a thermal printing system including a thermal head and a platen roller.

The printer 1 has a printer main body 2, a control unit (CPU) 3, a ROM 4, a RAM 5, an operating portion 6, a display 7, a printing portion 8, a USB connecting terminal 9, a scanner connecting terminal 10, and a power switch 11.

The printer main body 2 is a stand-alone, and includes the ROM 4, the RAM 5, the operating portion 6, the display 7, the printing portion 8, the USB connecting terminal 9, the scanner connecting terminal 10, and the power switch 11. The printer main body 2 can have a USB flash drive (non-volatile memory) 12 connected to the USB connecting terminal 9, and a scanner (reading device) 13 connected to the scanner connecting terminal 10.

The control unit 3 controls the operating portion 6, the display 7, and the printing portion 8, using the RAM 5 as a working area, on the basis of a program preliminarily saved in the ROM 4.

The operating portion 6 and the display 7 can input and display required data and command by a key operation or a touch operation.

The printing portion 8 prints, by any printing system, predetermined information on a printing paper sheet (for example, a label 14) which is discharged and issued outside the printer main body 2.

The USB flash drive 12 connected to the USB connecting terminal 9 preliminarily creates and stores printing data required by a host computer 15 including any personal computer installed at a different work area from the printer 1 disposed at a printing operation site.

Connecting the USB flash drive 12 to the USB connecting terminal 9 and turning on the power switch 11 can supply the above-described printing data to a receive buffer in the RAM 5 of the printer 1.

As a content of the above-described printing data, such as a command for printing or a collation keyword, and required application software can be included (will be described later on the basis of FIG. 2A to FIG. 2D) as well as a printing content onto the label 14 by the printing portion 8.

The scanner 13 connected to the scanner connecting terminal 10 optically or electromagnetically reads contents of various kinds of a operation code 17 preliminarily printed or prepared on an operation list 16 made from, for example, a sheet-shaped material.

As the operation code 17, for example, a barcode or a two-dimensional code, in addition, various kinds of code by RFID medium applied with RFID (Radio Frequency Identification; wireless automatic identification) technique, which ensures a wireless data communication, is included. The operation code 17 is identification information such as a name, a feature, a shipping address, and/or a manufacturer name of a good or a product on which the label 14 is applied. An operation that the scanner 13 reads any of the operation codes 17 triggers performing of the printing operation by the printer 1 onto the label 14.

It should be noted that when the operation code 17 includes various kinds of code by the RFID medium, prepare the reading device that allows a wireless data communication as a reading device.

FIG. 2A to FIG. 2D are explanatory diagrams schematically illustrating one example of a content of printing data supplied from the USB flash drive 12 to the printer 1, and one example of a content of the operation code 17 that is read by the scanner 13.

FIG. 2A is an explanatory diagram of a collation keyword 18 (for example, "AAA") in printing data as well as the above-described printing content onto the label 14 by the printing portion 8 among contents of the printing data from the USB flash drive 12.

FIG. 2B is an explanatory diagram of an in-printing data keyword identification command 19 for identifying this collation keyword 18. A content of printing data from the USB flash drive 12 includes the collation keyword 18 and the in-printing data keyword identification command 19. Any keyword and command can be set as the collation keyword 18 and the in-printing data keyword identification command 19 in advance. For example, a command specifying a position of the collation keyword 18 in the printing data in FIG. 2A and its content can be set as the in-printing data keyword identification command 19 in FIG. 2B.

FIG. 2C is an explanatory diagram of the above-described collation keyword 18 in the operation code 17 among contents of the operation code 17 optically or electromagnetically read by the scanner 13. FIG. 2D is an explanatory diagram of an in-operation code keyword identification command 20 for identifying this collation keyword 18. A content of the operation code 17 read by the scanner 13 includes the collation keyword 18 and the in-operation code keyword identification command 20.

Any command can be set as the in-operation code keyword identification command 20 in advance, similarly to the in-printing data keyword identification command 19.

The control unit 3 controls to perform printing by the printing portion 8 onto the label 14 after collating a content of the operation code 17 that is read by the scanner 13 connected to the printer main body 2 (for example, the above-described collation keyword 18) and a content of the printing data supplied from the USB flash drive 12 connected to the printer main body 2 (for example, the above-described collation keyword 18).

That is, the operation code 17 and the printing data each include the collation keywords 18, and the control unit 3 controls to print desired data in the printing data (for example, "BBB" illustrated in FIG. 2A) on the label 14 when the collation keywords 18 in the operation code 17 and in the printing data match.

Especially, as illustrated in FIG. 1, as the above-described desired data, besides the above-described "BBB" (specifically, an authentication number 21 of a component, for example), a necessary printing content such as the above-described collation keyword 18 (for example, "AAA"), in addition, a barcode or a two-dimensional code, a date, a system name, and a manufacturer name (see FIG. 1) is selectable.

Furthermore, printing by the printing portion 8 onto one piece of the label 14 is performed at every one reading operation of the operation code 17 by the scanner 13.

The printing operation of the printer 1 of such configuration will be described on the basis of FIG. 3.

FIG. 3 is a flowchart describing a printing operation of the printer 1. First, at the step S1, by connecting the USB flash drive 12 to the USB connecting terminal 9, and the power switch 11 is turned on, printing data saved in the USB flash drive 12 is supplied to a receive buffer in the RAM 5 of the printer 1.

The above-described printing data is obtained, and its content is analyzed at step S2. Especially, as described in FIG. 2A and FIG. 2B, a content of the collation keyword 18 in the printing data ("AAA") is identified on the basis of the in-printing data keyword identification command 19.

Whether the operation code 17 that requires the operation list 16 has been read or not by the scanner 13 is determined at step S3.

In a case where the reading operation is not yet performed, the reading operation by the scanner 13 is demanded to an operator at step S4. Specifically, for example, by displaying a content that demands the reading operation of the operation code 17 by the scanner 13 on the display 7, the operator understands that it is a timing to perform the reading operation by the scanner 13.

After the reading operation by the scanner 13 is performed, at step S5, a content of the operation code 17 is obtained, and this is analyzed. Especially, as described in FIG. 2C and FIG. 2D, a content of the collation keyword 18 in the operation code 17 ("AAA") is identified on the basis of the in-operation code keyword identification command 20.

At the next step S6, the collation keywords 18 in the operation code 17 and the printing data are checked, and the control unit 3 collates the collation keyword 18 from the scanner 13 and the collation keyword 18 from the USB flash drive 12. When the collation keywords 18 match one another, a date is obtained at step S7, then, printing by the printing portion 8 onto the label 14 is performed at step S8.

After this printing, returning to step S3, the reading operation of the operation code 17 by the scanner 13 is confirmed. In a word, at every reading operation by the scanner 13, the printing operation onto the label 14 is performed sequentially with this as a trigger.

At step S6, in a case where the collation keywords 18 do not match, an error display is performed on the display 7 as a data error at step S9, and returning to step S3, the reading operation of the operation code 17 by the scanner 13 is confirmed.

It should be noted that in a case where there is a content requiring the alteration prevention and the fraudulent act prevention as a printing content onto the label 14, printing on the label 14 can be performed by obtaining the required data (for example, the authentication number 21 of a certain component "BBB") from the contents illustrated in FIG. 2A to FIG. 2D.

That is, as for the collation keyword 18 and desired data for printing, only an operator of the host computers 15 such as a personal computer installed at a different location apart from the printing operation site can change this by inputting as necessary, and an operator at the printing operation site cannot change the collation keyword 18 and the desired data for printing, thereby the alteration prevention and the fraudulent act prevention of the printing content onto the label 14 is ensured.

Furthermore, as for the USB flash drive 12 (non-volatile memory), the USB flash drive 12 stores printing data printing onto the label 14 by the printing portion 8 to make this printing data suppliable to the printer 1; the printing operation of the printing data onto the label 14 by the printing portion 8 is allowed after the control unit 3 collates a content of the operation code 17 read by the scanner 13 connected to the printer 1 and a content of the printing data supplied by the USB flash drive 12; thus the USB flash drive 12 can be used with the printer 1 of the stand-alone connected.

The embodiment of the present invention described above are merely illustration of one application example of the present invention and not of the nature to limit the technical scope of the present invention to the specific constructions of the above embodiments.

This application claims the priority based on Patent Application No. 2014-147746 filed in the Japan Patent Office on Jul. 18, 2014, and every content of this application is incorporated herein by reference.

The invention claimed is:

1. A printer comprising:
a printing portion configured to perform printing on a paper sheet;
a control unit configured to control the printing portion;
a memory connecting terminal configured to receive an external memory that stores printing data for printing by the printer;
a reading device configured to optically or electromagnetically read an operation code for the printer; and
a display configured to display a content that demands the reading operation of the operation code by the reading device, wherein
the control unit is configured such that prior to any printing of the printing data, the control unit compares a collation keyword included in the operation code read by the reading device and a collation keyword included in the printing data supplied from the external memory, and if the collation keywords match, the control unit controls the printing portion to print the printing data from the external memory onto the paper sheet,
the operation code includes an in-code keyword identification command for identifying the collation keyword in the operation code, and
the printing data includes an in-printing data keyword identification command for identifying the collation keyword in the printing data.

2. The printer according to claim 1, wherein the printing data is created outside the printer.

3. The printer according to claim 1, wherein the printer performs printing of the printing portion onto the paper sheet at every reading operation of the operation code by the reading device.

4. The printer according to claim 1, wherein the operation code includes a barcode or a two-dimensional code.

5. The printer according to claim 1, wherein the external memory comprises a Universal Serial Bus (USB) flash drive.

6. The printer according to claim 1, wherein the printing data further comprises an authentication number, a barcode, a two-dimensional code, a date, a system name, or a manufacturer name.

7. The printer according to claim 1, wherein the printing data further comprises a barcode printed on a same side of the paper sheet as the collation keyword.

8. The printer according to claim 1, wherein the in-printing data keyword identification command comprises a command specifying a position of the collation keyword in the printing data.

9. A system comprising:
the printer of claim 1; and
a computer provided at a second location different from a first location at which the printer is provided, wherein
the computer is programmed to input or alter the printing data or the collation keyword included in the printing data at the second location, and
the printing data or the collation keyword included in the printing data cannot be input or altered at the first location of the printer.

10. A printer comprising:
a printing portion configured to perform printing on a paper sheet;
a control unit configured to control the printing portion;
a memory connecting terminal configured to receive an external memory that stores printing data for printing by the printer;
a reading device configured to optically or electromagnetically read an operation code for the printer; and
a display configured to display a content that demands the reading operation of the operation code by the reading device, wherein
the control unit is configured such that prior to any printing of the printing data, the control unit compares a collation keyword included in the operation code read by the reading device and a collation keyword included in the printing data supplied from the external memory, and if the collation keywords match, the control unit controls the printing portion to print the printing data from the external memory onto the paper sheet.

* * * * *